July 10, 1934.  J. B. OSTERMEIER  1,966,105
METHOD OF AND APPARATUS FOR SEARCHING FOR ORES
Filed Sept. 30, 1932
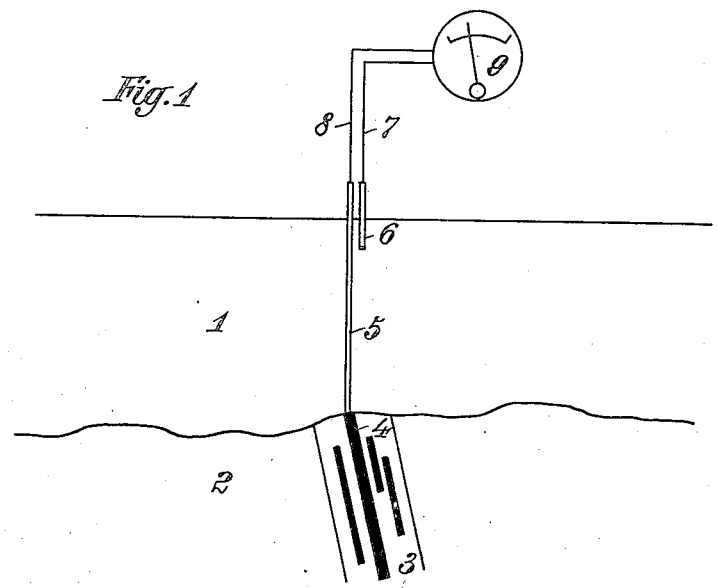
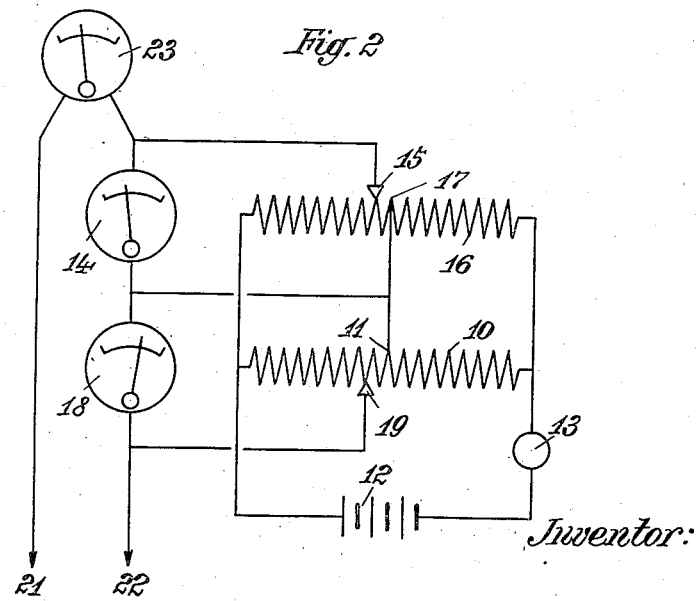
Inventor:
Johann B. Ostermeier
By [signature]
Attorney.

Patented July 10, 1934

1,966,105

UNITED STATES PATENT OFFICE 1,966,105

METHOD OF AND APPARATUS FOR SEARCHING FOR ORES

Johann B. Ostermeier, Mering, near Augsburg, Germany, assignor to Hauser & Co. G. m. b. H., Augsburg, Germany Application September 30, 1932, Serial No. 635,687 In Germany December 8, 1931

6 Claims. (Cl. 175—182)

The present invention relates to a method of and apparatus for searching for ores.

Above certain deposits of ore spontaneous potential differences may be traced or detected at the surface of the earth and it has been found, that these potential differences are due to chemical processes engendered at the points of contact of the surfaces of the deposit with an electrolyte, which for instance may consist of oxidizing layers of underground water. By locating the points of equal potentials of the earth field produced by such deposit of ore it is possible to determine the lines which enclose the projection of the places of origin of said earth currents on the surface of the earth, and thus draw valuable conclusions as to the form and location of the body of ore.

This method of prospecting for ores can of course only be carried into effect if the tracts of land which are supposed to contain ore deposits are relatively easily accessible. In primeval forests and in mountainous, rocky country the possibilities of utilizing said method are therefore usually very limited and in regions of this character it will accordingly seldom be possible to obtain a correct impression of the distribution of the ore. Neither is said method well suited for tracing deposits of ore which are eroded in rivers, lakes and other waters. The water covering ore deposits of this kind is usually more or less turbid and it is therefore not possible to inspect the deposits directly, so that any prospector would have to rely on a geodetical measuring method. However, on account of the difficulties connected with the determining of the geodetical measuring points and on account of the shortness of the sections of the geodesic lines only unintelligible disconnected observation material is obtained. Moreover, the performance of this method is connected with much loss of time.

Methods of the said kind serve mainly for determining the total extension of veins or beds of ore. When searching for the gangue of diluvial ore it is, however, at first sufficient to ascertain the location of the eroded outcrop or basset edge in the bed of the waters. In most cases the location of such outcrop can not be ascertained by visual inspection and it is in many cases also not possible to obtain information relating to the location of the gangue by tracing on the banks of the waters even if no natural obstacles are present, such as for instance dense woods on the banks or mineral layers covering the gangue. It is therefore evident, that an objective searching method, making it possible to determine the location of veins of gangue laid free by erosion but not accessible for visual inspection, would represent a vast improvement in the art.

Such a method forms the object of the present invention. It solves the problem discussed above and makes the tracing and locating of deposits of ore a comparatively easy and simple task, even under unfavorable outer conditions. My invention is based upon the following observation: If two electrodes of equivalent metals be dipped in water and both electrodes connected to a highly sensitive galvanometer at first no deflection of the pointer will be observed. If a body of ore, for instance a sulfidic compound, be placed in the vessel in which the experiment is performed (which vessel should be of insulating material in order to avoid disturbing polarization phenomena) there will still not be observable any considerable deflection. However, as soon as one of the metallic electrodes touches a spot of said ore body the pointer of the galvanometer will be deflected substantially, showing that a potential difference has been created. This potential difference, which in many cases may amount to several tenths of a volt, is due to the metallic ore face being chemically acted upon by the electrolyte. By means of the compensation method commonly used in experimental physics the potential difference may be compensated until the pointer of the galvanometer again is brought back into zero position and the potential difference created through the chemical process at the surface of the ore may be ascertained by determining the compensating or equalizing potential. It is thus possible to determine the coordinated potential differences for characteristic mineral combinations in respect to any chosen electrode substances and electrolytes of known composition and concentration. Reversedly, when the characteristical potential difference of certain minerals in respect to different electrode substances and electrolytes are known, it is possible from this knowledge to draw conclusions as to the nature of the mineral surface touched by the electrode.

In accordance with the invention the observation of the potential difference created between two electrodes, separated by an electrolyte, when one of the electrodes touches a body of ore, may be used for detecting and locating under-water deposits of ore, such as for instance eroded veins or beds of ore, ore rubbish, disintegrated ore or diluvial ore in which particles of noble metals or substances containing noble metals are present. For this purpose electrodes are used which are of equivalent material and are connected to an indicating instrument. This instrument may for instance be a measuring instrument or a relay adapted to operate an optical signal or any other suitable signal device. Also a registering instrument may be used. Moreover, instead of a single instrument a plurality of electrically interconnected instruments may be employed. It has already been mentioned, that the electrodes should be of equivalent material. This means that the material of the electrodes should be so chosen, that both electrodes will behave equivalently in an electrochemical respect. If the electrodes are not composed of electrochemically equivalent materials a potential difference will be created also in the absence of ore bodies, since the electrodes together with the water as an electrolyte will form a galvanic element.

In practice the electrodes are preferably arranged near each other and are rigidly connected to each other. This is advantageous, since, on account of the small distance between the electrodes, the disturbing potential differences of the natural earth field mostly are reduced to so low a value, that they no longer exert any perceptible influence on the results of the measurements. Moreover, on account of the small distance between the electrodes the resistance of the electrolyte is low, so that a current of high density is generated in the circuit by the potential difference arising when the surface of the ore is touched and a strong deflection of the pointer of the galvanometer is also produced. The device may be made of convenient shape, for instance by fastening both electrodes on a common probe from which only one double wire leads to the indicating instrument.

Two forms of apparatus in accordance with the invention are shown by way of example in the accompanying drawing.

Fig. 1 shows schematically a simple form of apparatus according to the invention in operative position.

Fig. 2 shows the wiring diagram of a more complicated form of the novel apparatus.

From an inspection of Fig. 1 the principle of the device will become apparent. It is assumed, that through the erosion of the water 1 in the river bed 2 a vein-shaped deposit 3 with ore bodies 4 has been laid bare. If both electrodes 5 and 6 be dipped in the water and one of the electrodes for instance the electrode 5 touches the surface of the deposit a current will flow through the galvanometer 9 which is connected with the electrodes over the wires 7 and 8. This current causes a deflection of the galvanometer hand and this deflection indicates that one of the electrodes has touched a bare ore surface.

As before mentioned, however, several disturbances occur when an apparatus of this kind is used and moreover the effect of the contact between the electrode and the ore is only indicated qualitatively. Fig. 2 shows an arrangement which may be used for qualitative measurements also and by means of which said disturbances may be balanced or counteracted or neutralized.

In many cases there is a temperature difference between the contact points of the wires and the electrodes and the contact points of said wires with the meter, since the water surrounding the electrodes frequently has a temperature differing from that of the air surrounding the meter and appertaining elements. Through this temperature difference thermo currents are generated which may cause the galvanometer to register deflections even if both electrodes be immersed in water without touching any ore. If now, at the commencement of the measurements, the device be left to itself until the deflection caused by the thermo currents has become constant, this deflection may be eliminated by applying an auxiliary potential of the same value as the voltage of the thermo current. A meter located in the compensation circuit will then show the height of the disturbing potential. It is further possible in the same manner by means of an additional circuit to measure the potential which is created when an electrode touches the surface of an ore deposit thus causing the galvanometer to register a deflection. Circuits of this kind may of course be arranged in the leads of any galvanometer or probe.

A measuring arrangement which is well suited for practical use is shown in Fig. 2. Normally both electrodes 22 and 21 are connected to the galvanometer 23. In one of the electrode leads the compensation circuits 14, 15, 16, 17 and 10, 11, 18, 19 are arranged in series and by means of a switch 13 the said circuits may be connected to a source of voltage 12. On the same principle the compensation circuits might be connected to the galvanometer in parallel.

The measuring operations may suitably be carried out in the following order: By adjusting the members 15 and 19 of the variable resistances the compensation circuits are at first held currentless, so that the indicating instruments or meters 14 and 18 of these circuits remain in zero position. Both electrodes may now be immersed in water without being brought into contact with a body of ore or metal adapted to produce a potential difference. If thermo currents are generated the galvanometer will, however, nevertheless indicate a potential difference which may be measured and balanced by means of one of the compensation circuits. If one of the electrodes touches a body of ore adapted to produce a potential difference, such as for instance a sulfiding ore, the pointer or galvanometer will again be deflected and this deflection may be reduced to zero by means of the second compensation circuit. The meter in the second compensation circuit will indicate the potential difference to be compensated and on basis of the value given by the meter conclusions as to the composition of the mineral touched by the probe or sound may be made. After a longer contact between the electrode and a body of ore or metal polarization currents remain, and due to the effect of these currents false values may be obtained during the continued measuring operations. These residual currents may be eliminated just like the thermo-currents by means of a further compensation circuit. It is, however, also possible to balance these currents by means of the compensation circuit used for eliminating the thermo currents. The balancing operation may be carried out from case to case or after each measuring operation. Also all other disturbing effect such as the earth currents of the constant earth field and the like may be compensated by separate circuits or by a few circuits of which each is adapted simultaneously to balance more disturbing effects. Also a common compensation circuit may be used for eliminating the said disturbances. Finally a single compensation circuit may be used for determining quantitatively the potential differences created through the contacts with ore and the like. The measurings and the compensations are also in this case performed substantially in the same manner as described above in connection with the use of a plurality of circuits.

According to a further modification of the invention, the device may be equipped with a switching device for observing deflections of the galvanometer. When with a device of this kind the deflection of the galvanometer has been determined, the galvanometer is brought back into zero position by means of a compensation circuit and by operating the switching device the galvanometer is now coupled to the compensation circuit and will serve as a volt meter for the same. Through this measure the use of a plurality of instruments may be avoided.

If it is desired only to perform qualitative measuring operations, in order to determine the position of the body creating a potential difference, it would per se be sufficient to connect both electrodes with the galvanometer. All disturbing effects might in this case be eliminated summarily by means of a compensation circuit.

The novel method is not only applicable in connection with ore deposits which have been laid bare or exposed by erosion. The same method may also be used for tracing deposits in moist broken-up rocks and sand, adapted to create a potential difference between both probes or sounds when contacting with one of the same. In this way, for instance, ore-containing rocks, particles of noble metals in fine sand (diluvial, gold and platinum formations) and the like may be traced or located. The distribution of ore particles originating from an eroded formation may, for instance, be traced in the direction of a river bed. In the neighbourhood of the mother deposit a greater concentration will be observed by the deflections increasing at the same potential difference. As soon as the mother deposit has been passed the concentration suddenly decreases. It is therefore possible to fix the point of erosion and by means of the same method to trace or locate the mother deposit in the river bed proper.

The novel method makes it possible to search the sediments and beds of waters in an incomparably shorter time than that needed when the older methods are employed. Moreover, by means of the hitherto known methods it is only rarely possible to determine or locate successfully ore formations such as for instance diluvial deposits, the distribution of diluvial deposits and the like. Moreover none of the older searching methods will indicate the connections between deposits of any kind and the mother source so clearly as the present invention. The invention may also be used for determining the presence of ore and metal in dry sands. For this purpose the sand will be moistened or soaked with a fluid, which eventually may be acidified and which will act as an electrolyte.

I claim:—

1. A method of searching for ore deposits comprising the steps of connecting two electrodes of electrically equivalent material in a circuit by means of an intermediate electrolyte such as water, testing the ground by means of one of the electrodes and determining the potential difference which is created between said electrode and the second electrode when the first named electrode touches an ore deposit.

2. A method of searching for ore deposits comprising the steps of connecting two electrodes of electrically equivalent material in a circuit by means of an intermediate electrolyte such as water, testing the ground by means of one of the electrodes and, through employment of a source of voltage, determining quantitatively through compensation according to zero method the potential difference which is created between said electrode and the second electrode when the first named electrode touches an ore deposit.

3. A method of searching for ore deposits comprising the steps of connecting two electrodes of electrically equivalent material in a circuit by means of an intermediate electrolyte such as water, testing the ground by means of one of the electrodes and through employment of a source of voltage, determining the potential difference which is created between said electrode and the second electrode when the first named electrode touches an ore deposit and repeating these steps for determining the concentrations of ore-containing sands and disintegrated rocks in the direction of the origin of the same.

4. A device for determining the presence and character of ore deposits comprising a measuring instrument for measuring the potential differences created between two electrodes when one of the latter is brought into contact with an ore deposit in the presence of an electrolyte, and two rigidly interconnected electrodes which are conductively connected to the said instrument and consist of materials which with respect to their electrochemical properties towards the electrolyte are equivalent.

5. A device for determining the presence and character of ore deposits comprising an indicating instrument two electrodes which are conductively connected to said instrument and compensation circuits for determining and eliminating potential differences created when one of the electrodes touches an ore deposit and for determining and compensating disturbing influences.

6. A device of the class described comprising two electrodes which, with respect to their electrochemical properties toward an electrolyte, are equivalent; and a measuring instrument conductively connected to said electrodes for measuring the difference in potential created between said electrodes when one of the latter is brought into contact with an ore deposit in the presence of an electrolyte.

JOHANN B. OSTERMEIER.